Nov. 29, 1966  J. R. PUENTE  3,287,765
ADJUSTABLE FRAMEWORK FOR MOLDING
Filed Feb. 5, 1965  5 Sheets-Sheet 3

INVENTOR.
JOSE R. PUENTE
BY
Crumpston + Shaw
HIS ATTORNEYS.

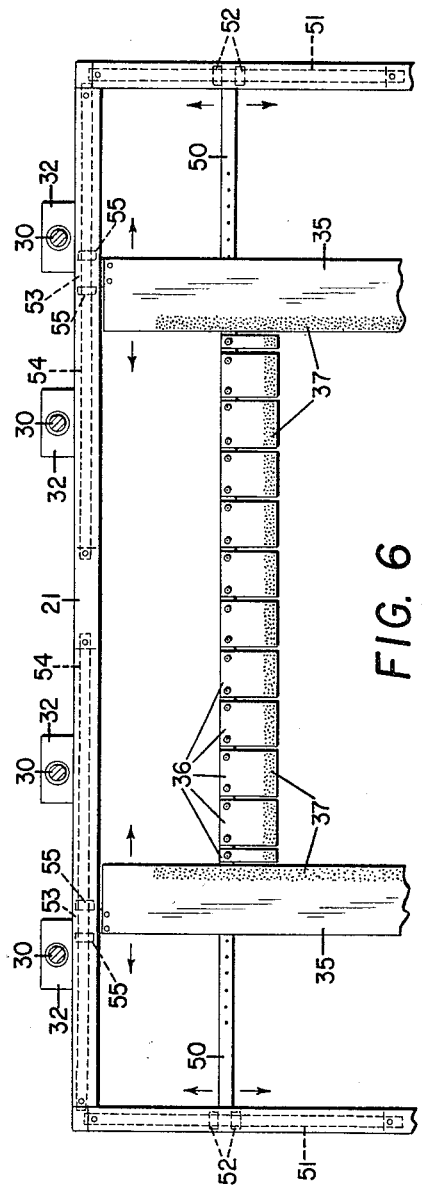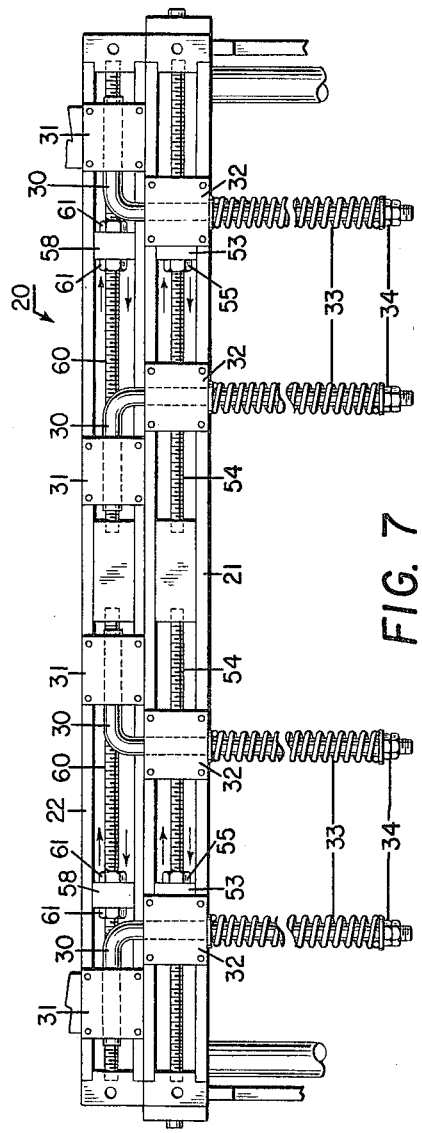

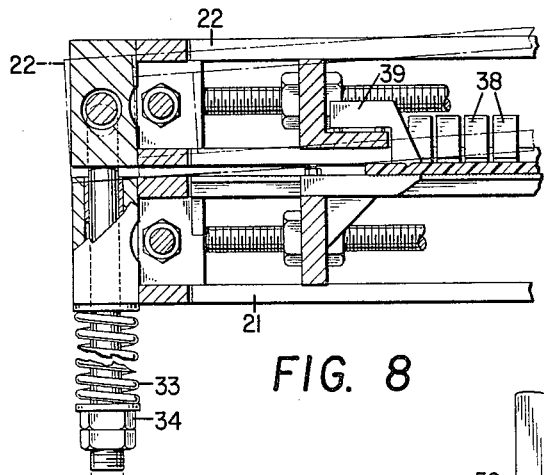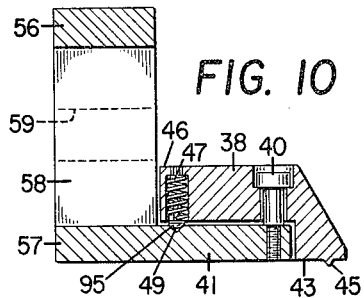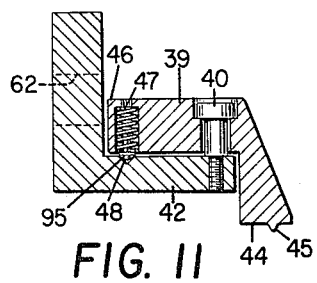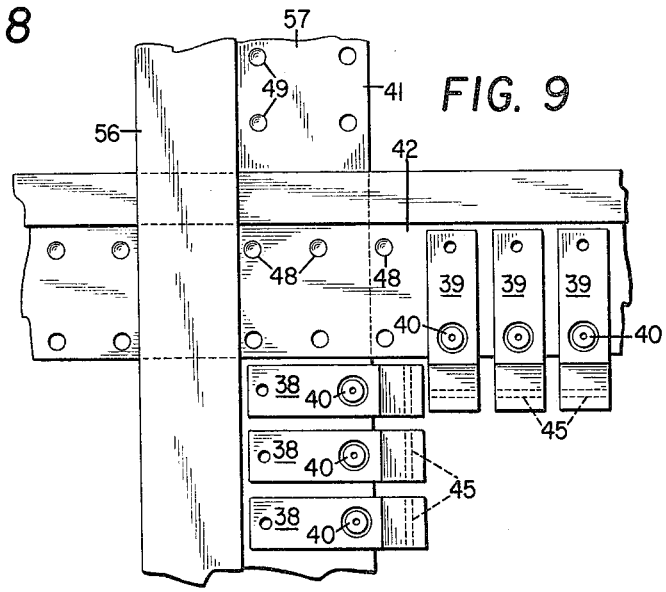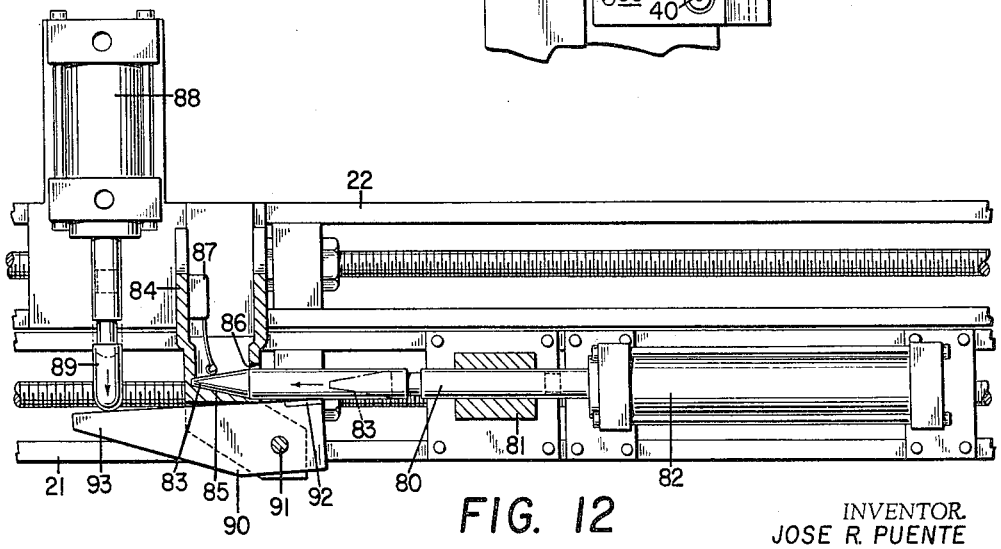

United States Patent Office 3,287,765
Patented Nov. 29, 1966

3,287,765
ADJUSTABLE FRAMEWORK FOR MOLDING
Jose R. Puente, Rochester, N.Y., assignor to Leaming Industries, Inc., Canandaigua, N.Y., a corporation of New York
Filed Feb. 5, 1965, Ser. No. 430,638
16 Claims. (Cl. 18—19)

This invention relates to an adjustable framework for molding, and more particularly to an adjustable framework for supporting variable sizes of sheets of moldable material during molding operations.

In many molding operations, and especially in vacuum forming operations, a sheet of moldable material, for example, a sheet of thermoplastic material, is supported in a framework. Typically, such a supporting framework is formed of upper and lower frame members that are hingedly connected and that can be opened and closed for inserting a sheet of material and removing the molded object. The molding operations usually include heating if the material to be molded is a thermoplastic and may include movement of either the supporting framework or mold members so that considerable stress is placed upon the sheet held in the framework.

Previous sheet-supporting frameworks for molding operations have been expensive, difficult to repair, and adapted to hold only a single sized sheet. Also, such previous frameworks have not performed well in holding sheets firmly and evenly without either excess or inadequate pressure around the edges of the sheets.

An object of this invention is to overcome the disadvantages of previous sheet-supporting frameworks for molding operations.

Another object of the invention is to support sheets of material for molding operations in an economical and adjustable framework in which the sheets are gripped firmly and evenly around their edges without either cutting into the sheets or letting them slip loose.

Another object of the invention is to grip a sheet of thermoplastic material by even pressure around its periphery within a framework that functions consistently, reliably, and accurately in gripping successive sheets during molding operations.

Another object of the invention is to hold sheets for molding operations by an adjustable framework that is economical to make and repair, convenient and reliable to operate, and easy to adjust for accepting various sized sheets of material.

Another object of the invention is to make a sheet-supporting framework that automatically grips various thicknesses of sheets with even, predetermined gripping force.

Another object of the invention is to provide a sheet-supporting framework having interchangeable, standardized parts that are easily removed and replaced.

To these and other ends, the invention resides in certain improvements and combinations, all as will be hereinafter more fully described, the novel features being pointed out in the claims at the end of this specification.

In the drawings:

FIG. 6 shows a fragmentary plan view of the bottom frame of a framework according to the invention;

FIG. 7 shows a rear elevation of an adjustable framework according to the invention;

FIG. 8 shows a fragment of the cross section view of FIG. 4 illustrating the operation of the hinge for a framework according to the invention;

FIG. 9 shows an enlarged fragment of the plan view of FIG. 2 showing clamping fingers for a framework according to the invention;

FIGS. 10 and 11 show cross section views of clamping fingers and clamping finger support means for a framework according to the invention; and FIG. 12 shows a fragmentary front elevation of a latching means for a framework according to the invention.

Throughout the drawings, corresponding parts are identified by the same reference numerals.

Figure 1:
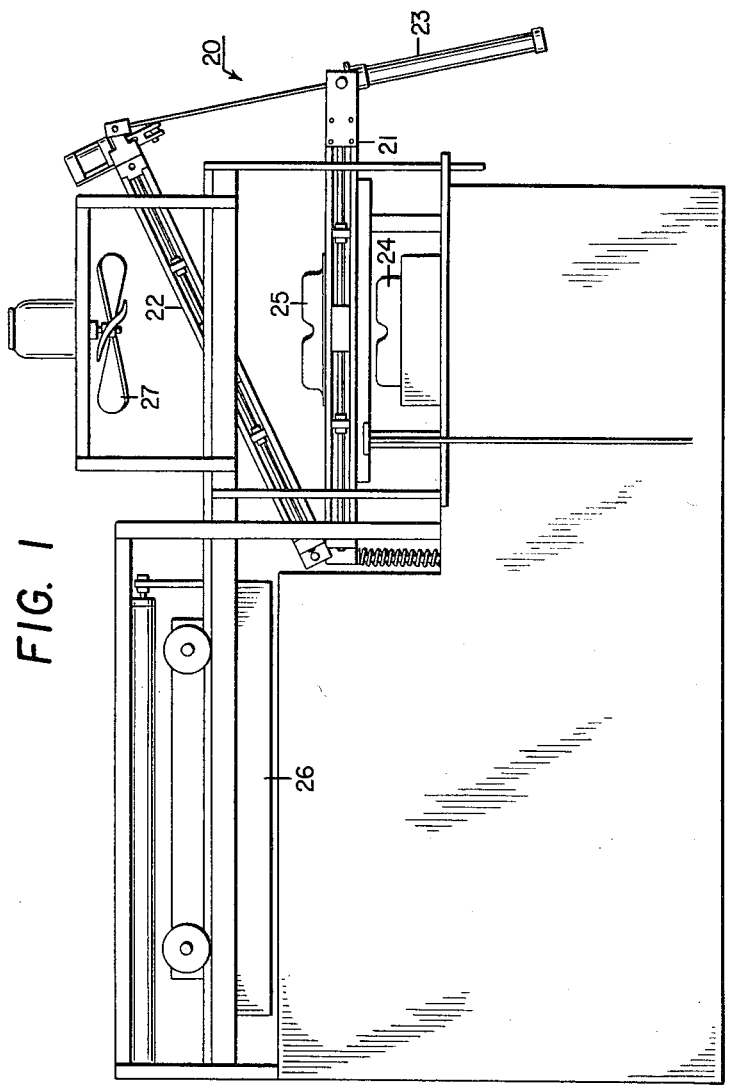
FIG. 1 shows a partially schematic side elevation of an adjustable framework according to the invention as used in a molding operation.

Generally, the adjustable framework 20 according to the invention includes a lower frame 21 and an upper frame 22 as shown in FIG. 1. Lower frame 21 and upper frame 22 are preferably hingedly connected so that they can be separated to the illustrated open position and brought together to a closed position in which upper frame 22 closely overlies and registers with lower frame 21. Any of a variety of devices can be used for conveniently opening and closing framework 20, but many molding operations include a source of pneumatic power, and for such operations it is preferred that pneumatic power such as schematically illustrated by cylinder 23 be used for separating and closing the upper and lower frames.

Male mold core 24 and female mold cavity 25 are shown arranged in the vicinity of framework 20 for molding operations. A heating element 26 is shown mounted on rails for transverse movement over framework 20 and for withdrawal to the retracted position as illustrated in FIG. 1. Fan 27 is arranged for cooling the molded article preparatory to its withdrawal from the mold.

The adjustable framework according to the invention is suitable for use in many molding operations and can be applied to holding of sheets for other purposes, so that it is not limited to use with the illustrated molding operations. Thus, vacuum forming and other molding operations can be carried on in cooperation with an adjustable sheet-holding framework according to the invention.

The hinged connection between upper frame 22 and lower frame 21 is best shown in the rear elevation of FIG. 7. Hinge rods 30 are pivotally housed in blocks 31 that are fixed to upper frame 22, and are mounted for vertical sliding in blocks 32 fixed to lower frame 21. Springs 33 are compressed between the ends of hinge rods 30 and blocks 32 so as to urge blocks 31 and upper frame 22 forcefully down against lower frame 21 to eliminate any looseness or play between upper frame 22 and lower frame 21 caused by wear or adjustment of the hinge interconnecting them. Upper frame 22 and lower frame 21 are thus held together along their back edges by a predetermined bias or force exerted by springs 33. This force can be varied by adjustment of nuts 34 at the lower ends of hinge rods 30. Of course, the mounting of hinge rods 30 can be reversed relative to the upper and lower frames and still accomplish a similar result.

As shown in broken lines in FIG. 8, upper frame 22 is pulled downward under the influence of springs 33 as the framework is opened and upper frame 22 is raised upward away from lower frame 21. As the front edges of the upper and lower frames are drawn forcefully together, springs 33 are compressed to urge upper frame 22 downward against lower frame 21.

Upper frame 22 and lower frame 21 are adapted to clamp a sheet of material for molding between themselves when brought to their closed position. To this end, one half of a clamping element is arranged on upper frame 22 and the other corresponding half of such clamping element is arranged on lower frame 21, and a sheet of material for molding is gripped between the two halves of the clamping element when frames 22 and 21 are brought closely together.

It is preferred that the clamping element arranged on lower frame 21 be sheet-supporting means such as supporting plates 35 and 36 as illustrated in FIG. 6. Support plates 35 and 36 are preferably embossed, patterned, or made uneven along their inner edges as indicated at 37 so as to have better gripping surfaces for engaging the underside of a sheet of material. Support plates 35 and 36 are arranged so that a generally rectangular sheet of material can be laid on support plates 35 and 36 with the edge of the material resting on the embossed areas 37, and when upper frame 22 is lowered into contact with lower frame 21, a sheet of material so positioned will be held against support plates 35 and 36.

As best shown in FIGS. 9–11, a plurality of clamping fingers 38 and 39 are provided for the upper frame. Each clamping finger is in the form of a rockshaft that is loosely secured to a support bar or member by a screw 40. Thus, clamping finger 38 is secured by screw 40 to support bar 41 for rocking motion, and clamping finger 39 is secured to support bar 42 by screw 40 for a rocking motion. Each of the clamping fingers 38 and 39 has a gripping end extending downward for engaging a sheet of material. The gripping end 43 of clamping finger 38 and the gripping end 44 of clamping finger 39 each preferably have a raised ridge 45 for securely engaging the upper surface of a sheet of material.

Clamping fingers 38 and 39 each have lever ends 46 that are biased upward away from their respective supporting plates preferably by springs 47 that are compressively housed in recesses at the under surfaces of the lever ends 46 of clamping fingers 38 and 39. Preferably a series of shallow recesses 48 and 49 are formed respectively in support bars 42 and 41 for receiving detent pins 95 that are urged into engagement with their respective recesses by springs 47. The compressive trapping of springs 47 between support bars 41 and 42 and clamping fingers 38 and 39 respectively urges the gripping ends 43 and 44 of the clamping fingers downward to force ridges 45 into the upper surface of a sheet of material.

Individual springs 47 for each of the respective clamping fingers 38 and 39 accomplish a uniform biasing of each clamping finger so that at each clamped point around the periphery of the sheet of material, clamping fingers engage the material with equal and uniform pressure. Also, varying thicknesses of material are automatically compensated for by individually spring-loaded clamping fingers 38 and 39. The upper and lower frames can be drawn closely together, and the yieldable clamping fingers 38 and 39 exert substantially uniform pressure around the entire periphery of a sheet of material regardless of practical variations in the thickness of the sheets of material held in the framework.

The gripping force of clamping fingers 38 and 39 can be adjusted by varying the compressive force of springs 47. Also, shims can be arranged under clamping fingers 38 and 39 or they can be connected to their support bars 41 and 42 by screws that allow greater play between the clamping fingers 38 and 39 and their respective support bars 41 and 42 to vary the gripping force of the fingers. In practice, it has not been found necessary to change the gripping pressure of clamping fingers 38 and 39 frequently. For a typical sheet of thermoplastic material, a downward gripping force exerted by clamping fingers 38 and 39 is preferably about 40 pounds per square inch.

Figure 2:
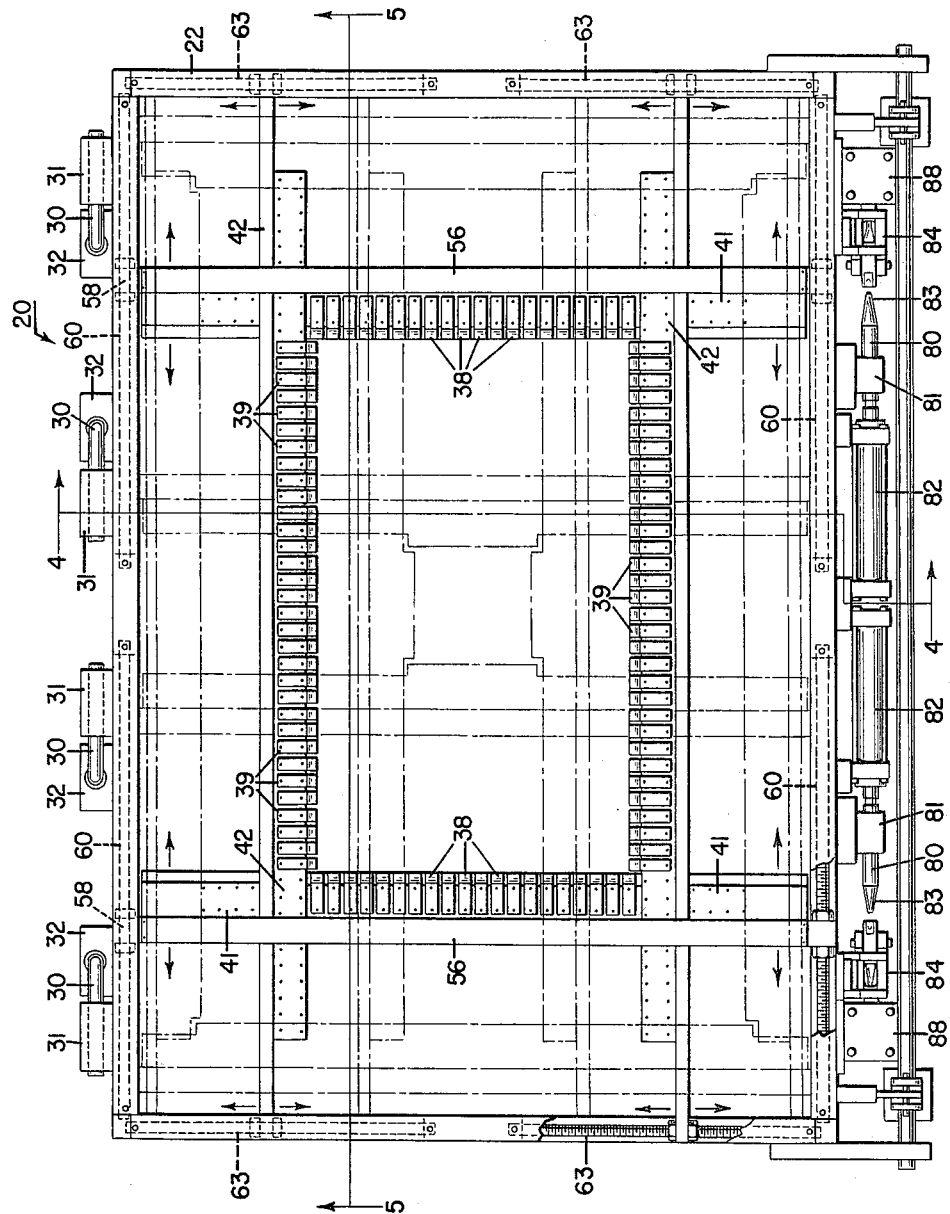
FIG. 2 shows a plan view of an adjustable framework according to the invention.

The complete array of clamping fingers 38 and 39 as arranged on supporting bars 41 and 42 is best shown in FIG. 2. Preferably a great plurality of closely spaced clamping fingers is arranged around the periphery of the sheet of material to be held, so that the material is closely gripped around substantially all of its periphery. The individual spring bias of each clamping finger insures that such peripheral gripping is even and uniform.

The illustrated framework 20 according to the invention is adapted to support and hold a variety of sizes of generally rectangular sheets. To this end, the clamping means of both the upper frame 22 and lower frame 21 are correspondingly adjustable so that a sheet of any desired rectangular size can be gripped at its periphery. Such adjustableness is important so that precisely the correct size of sheet can be used in any desired molding operation and so that the framework is adapted to a variety of molding processes and operations and separate frames need not be used for each job.

Adjustment of the support plate means 35 and 36 of the lower frame is best shown in FIG. 6. Preferably, support plates 35 extend in one piece for the full length or width of lower frame 21. Thus, support plates 35 extend from the rear hinge area of frame 21 to the front edge and are each adjustable transversely of frame 21 as indicated by the arrows. Segmental support plates 36 are fastened to bar 50 extending transversely of frame 21 and adjustable forward and back relative to frame 21 as illustrated by the arrows. Bar 50 passes under support plate 35, and individual support plates 36 are preferably screwed to bar 50. The number of support plates 36 can thus be varied to fill the distance between support plates 35. Thus, if support plates 35 are moved farther apart, additional support plate segments 36 can be secured to bar 50 to fill the distance between support plates 35, and, conversely, when support plates 35 are moved closer together, appropriate support plate segments are removed.

Figure 3:
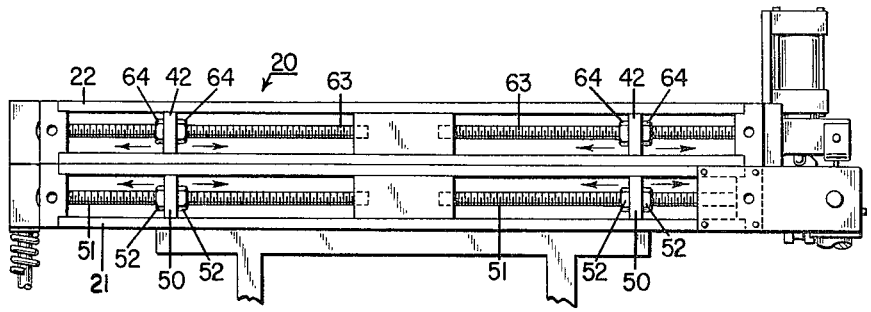
FIG. 3 shows a side elevation of an adjustable framework according to the invention.
Figure 4:
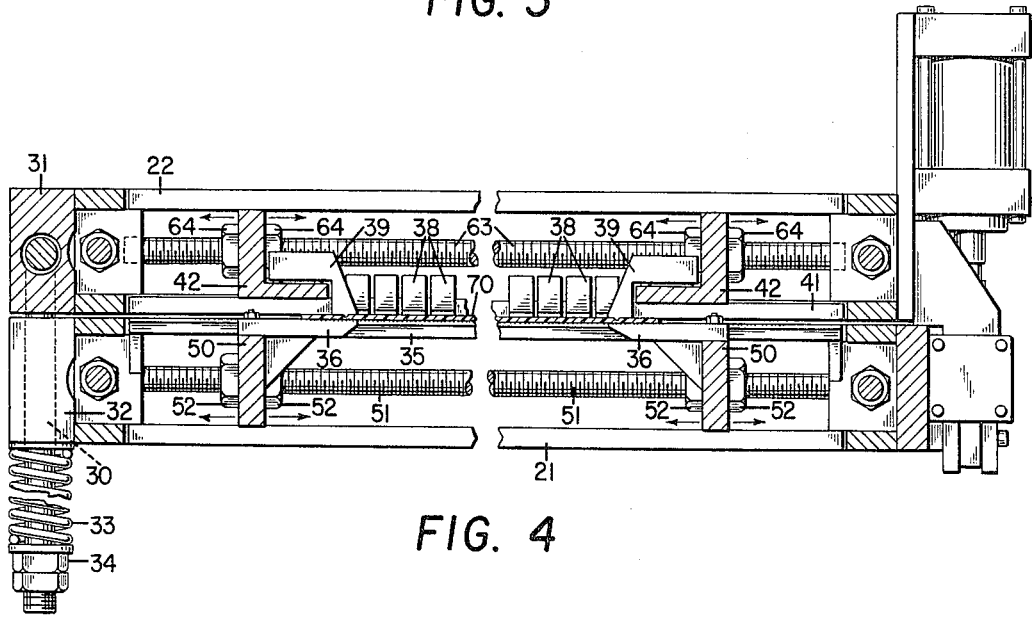
FIG. 4 shows a cross section of the framework of FIG. 2 taken along the line 4—4 and viewed in the direction of the arrows.

As best shown in FIGS. 3 and 4, bar 50 bearing support plate segments 36 is slidable forward and back relative to frame 21 on screw-threaded rods 51 in the direction of the arrows. To move bars 50, set nuts 52 are loosened from their illustrated engagement with bars 50, and bars 50 are moved to the desired location whereupon set nuts 52 are turned up closely against bars 50. Thus, bars 50 can be secured in any desired position along the lines of their respective rods 51.

Similarly, support plates 35 have end bars 53 for engaging screw-threaded rods 54 at the front and back edges of lower frame 21 as best shown in FIGS. 6 and 7. The transverse position of support plates 35 is set by set nuts 55 in the manner described above for bars 50.

Figure 5:
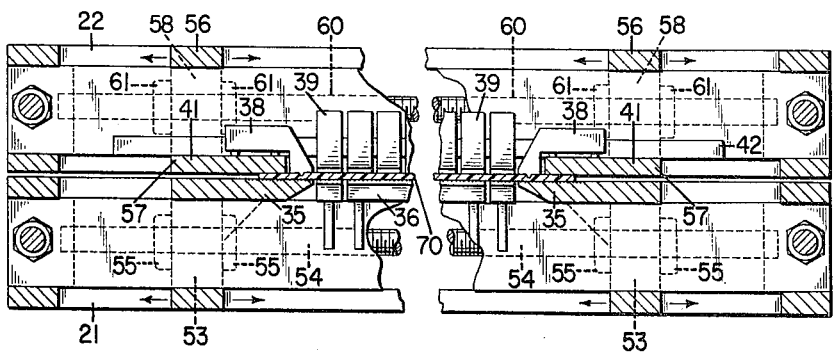
FIG. 5 shows a cross section of the framework of FIG. 2 taken along the line 5—5 and viewed in the direction of the arrows.

Not only are support plates 35 and 36 adjustably set to receive the edges of a sheet of material of the desired size, but the clamping fingers carried by upper frame 22 are correspondingly adjustable so as to press downward onto the periphery of a sheet of material arranged on the support plates. Accordingly, similar adjustments are made to support members 41 and 42 carrying clamping fingers 38 and 39 respectively. As best shown in FIGS. 5, 7, and 10, support bar 41 is formed with an upper bar 56 and a lower bar 57 spaced apart throughout most of their length and connected at their ends by end plates 58 each of which has a bore hole 59 for receiving threaded rods 60. By loosening set nuts 61, support bars 41 can be moved transversely of frame 22 to any desired position within the extent of threaded rods 60. To retain support members 41 in their desired position, set nuts 61 are turned up against end plates 58 of support members 41. It is preferred as illustrated in FIGS. 5 and 7 that proper relative adjustment between support members 41 relative to support plates 35 occurs when end pieces 53 and 58 are in mutual vertical alignment on their respective screw-threaded rods 54 and 60.

As best shown in FIGS. 4 and 11, support member 42 is preferably in the form of an angle piece dimensioned to fit closely into the space between upper bar 56 and lower bar 57 of support member 41 so as to be slidable within such space relative to support member 41. The upright portion of support member 42 is provided with a bore 62 at its ends for receiving screw-threaded rods 63 arranged along the sides of upper frame 22. In a manner similar to that described above, set nuts 64 can be loosened to allow forward and back adjustment of support members 42 on screw-threaded rods 63, and can be turned tightly against support member 42 to secure it in place. Respective mutual alignment between support plate segments 36 and clamp fingers 39 preferably occurs when support member 42 and bar 50 are in mutual vertical alignment as best shown in FIG. 3.

Because support member 42 rides above the base bar 57 of support member 41, it is spaced above the sheet of material to be gripped by an amount equal to the thickness of support plate 57. Accordingly, clamping fingers 39 supported on support member 42 extend downward for a distance equal to the thickness of base plate 57 so as to have their gripping ends 44 in the same vertical plane with the gripping ends 43 of clamping fingers 38. This relative relation can best be seen from FIGS. 4 and 5. Clamp fingers 39 of FIG. 4 are shown extending downward beyond support member 42 for a distance equal to the thickness of support member 41 so as to be even with clamp fingers 38 in the plane of engagement with a clamped sheet of material 70. Also, in FIG. 5, clamp fingers 38 are shown extending over support member 41 and into engagement with clamped sheet 70 while clamping fingers 39 extend further downward from their more elevated position as supported on support member 42.

The limits of adjustment of the clamp members of the upper and lower frames according to the inventive framework are best shown in the plan view of FIG. 2 in the broken lines. As illustrated in FIG. 2, the clamping fingers are in an intermediate position and can be extended inward to the narrowest broken line position or outward to the widest broken line position near the outer edge of the framework 20.

It is important for the proper functioning of the clamping fingers and the supporting plates in evenly gripping a sheet of material that upper frame 22 and lower frame 21 be forced into close engagement with each other. Any spacing apart of upper frame 22 and lower frame 21 would reduce the gripping force of clamping fingers 38 and 39, and if such space were at one edge of the framework, the gripped sheet might come loose during molding operations.

The spring biasing of the back edge of frame 22 against frame 21 at the point of their hinged interconnection has been described above. To ensure that upper frame 22 is closely engaged with lower frame 21, it is important that the front or opposite edges of the frames also be drawn closely together. As best shown in FIGS. 2 and 12, a clamping or latching mechanism according to the invention cooperates with the adjustable sheet clamping means of the upper and lower frames by forcing the frames into close mutual engagement.

A slidable latch bar 80 is supported in a bearing block 81 that is preferably mounted on lower frame 21. Bar 80 is movable in a reciprocal sliding motion, and is preferably driven by pneumatic means 82. Slide bar 80 is normally retracted to the broken line position illustrated in FIG. 12 and preferably is movable in the direction of the arrow in response to closing of upper frame 22 down over lower frame 21.

Bar 80 is arranged to be driven by pneumatic means 82 in the direction of the arrow into a latch means 84 arranged on upper frame 22. Latch means 84 has an opening or socket 86 that preferably includes a cammed ramp 85 adapted to be engaged by the preferably tapered end 83 of bar 80 as it is driven into socket 86. The driving engagement of the tapered end 83 of bar 80 against ramp 85 is such as to cam upper frame 22 downward into closer engagement with lower frame 21 as bar 80 is driven into socket 86.

Driving of bar 80 home into socket 86 actuates microswitch 87 to energize pneumatic driving means 88. Energization of pneumatic means 88 forces rod 89 downward into engagement with lever 90 that is pivoted about axle 91 that is supported on upper frame 22 by means of an extension of the latch member 84.

Downward thrust of rod 89 on the lever end 93 of lever 90 forces bearing plate 92 on the bearing end of lever 90 upward into engagement with bar 80 in its latched position. Bar 80 thus acts as a fulcrum by which upper frame 22 is driven into forced engagement with lower frame 21 through the levering of lever 90 against axle 91 connected to upper frame 22. It is preferred that the lever arm 93 of lever 90 be longer than the bearing arm of lever 90 so that a mechanical advantage is obtained from the force of pneumatic means 88 in driving the upper and lower frames together. Also, it is preferred that at least a pair of latching or clamping devices including bars 80 and levers 90 be arranged at the front edge of each framework according to the invention.

Of course, any members illustrated as arranged on the upper or lower frame can be inversed according to the invention, and the entire framework could be oriented on its side or edge, so that "upper" and "lower" refer only to the illustrated embodiment of the invention.

It can be seen that the invention accomplishes its stated objects in providing a simple, reliable and easily adjustable framework for evenly gripping sheets of material of various sizes and thicknesses.

While the invention has been disclosed herein by reference to the details of a preferred embodiment, it is to be understood that such disclosure is intended in an illustrative rather than a limiting sense, and it is contemplated that various modifications of the construction and arrangement of the parts will readily occur to those skilled in the art within the spirit of the invention and the scope of the appended claims.

I claim:

1. In an adjustable framework for holding a sheet of material for molding and including an upper frame and a lower frame that are separable and that can be brought into a closed position in which said upper frame closely overlies said lower frame, the improvement comprising: support plate means arranged on one of said frames; a plurality of movable clamping fingers arranged on the other of said frames; spring means associated with each of said respective clamping fingers for biasing each of said fingers towards said support plate means whereby said clamping fingers are adapted to hold said sheet against said support plate means when said frames are in said closed position; and clamp means for forcing said frames into close mutual engagement and including a slidable latch bar arranged on one of said frames and latch means arranged on the other of said frames, said latch bar being slidable into latching engagement with said latch means when said frames are in said closed position, said clamp means also including lever means pivotally mounted on said other of said frames for engaging said latch bar in said latched position, and means arranged on one of said frames for urging said lever means into engagement with said latch bar so as to force said frames into said mutual engagement.

2. The adjustable framework of claim 1 wherein said support plate means is arranged on said lower frame and said clamping fingers are arranged on said upper frame.

3. The adjustable framework of claim 2 wherein the number and position of said clamping fingers is adjustable and the position of said support means is correspondingly adjustable so that said framework can hold various sized sheets.

4. The adjustable framework of claim 1 including powered means for urging said lever means into engagement with said latch bar.

5. In an adjustable framework for holding a sheet of material for molding and including an upper frame and a lower frame that are hingedly connected to be separable and to be brought into a closed position in which said upper frame closely overlies said lower frame, the improvement comprising: adjustable support plate means arranged on said lower frame; a plurality of pivotally mounted clamping fingers arranged on said upper frame; springs associated with each respective one of said clamping fingers for biasing each of said fingers toward said support plate means whereby said clamping fingers are adapted to hold said sheet against said support plate means when said frames are in said closed position; and clamp means for forcing said frames into close mutual engagement when said frames are in said closed position, said clamp means including a slidable latch bar arranged on said lower frame, means for sliding said latch bar, latch means having a socket for receiving said latch bar, said latch means being arranged on said upper frame so that said latch bar is slidable into latching engagement with said latch means when said frames are in said closed position, said clamp means also including a lever pivotally mounted on said upper frame, one end of said lever being adapted for engaging the underside of said latch bar in said latched position, and driven means arranged on said upper frame for urging the other end of said lever downward to force said one end of said lever upward into engagement with the underside of said latch bar so as to force said frames into said mutual engagement.

6. The adjustable framework of claim 5 wherein said latch bar and latch means are arranged so that said frames are drawn toward said mutual engagement as said latch bar is driven into said socket.

7. The adjustable framework of claim 6 wherein said frames are separated and closed pneumatically, and said latch bar and said driven means are each driven pneumatically.

8. The adjustable framework of claim 5 wherein the number and position of said clamping fingers is adjustable and the position of said support plate means is correspondingly adjustable so that said framework can hold various sized sheets.

9. The adjustable framework of claim 8 wherein said support plate means are carried by gibs, the position of which are adjustable within said lower frame, and said clamping fingers are variable in number and supported by correspondingly adjustable gibs movable within said upper frame.

10. The adjustable framework of claim 5 wherein said hinged connection is spring-biased to urge said upper and lower frames towards said mutual engagement.

11. An adjustable framework for holding a sheet of material for molding, said framework comprising:
(a) a lower frame;
(b) an upper frame;
(c) hinge means connecting said upper and lower frames along one edge thereof, said hinge means being spring-biased to urge said frames toward mutual engagement;
(d) pneumatic means for separating said frames to an open position and for moving said frames together to a closed position in which said upper frame closely overlies said lower frame in registry therewith;
(e) adjustable support plate means arranged on said lower frame;
(f) first gib means arranged on lower frame for carrying said support plate means, said first gib means being adjustable longitudinally and laterally of said lower frame so that said support plate means is adapted to receive various sizes of sheets;
(g) a plurality of pivotally mounted clamping fingers arranged on said upper frame;
(h) second gib means arranged on said upper frame for carrying said clamping fingers, said second gib means being adjustable in correlation with said first gib means so that said plurality of clamping fingers are arranged in overlying registry with said support plate means;
(i) a plurality of springs respectively associated with each one of said clamping fingers for biasing each of said clamping fingers towards said support plate means when said frames are in said closed position whereby said clamping fingers are adapted to hold one of said sheets against said support plate means;
(j) a slidable latch bar arranged on said lower frame at an edge opposite said hinge means;
(k) pneumatic means for sliding said latch bar in two opposite directions;
(l) latch means arranged on said upper frame adjacent said latch bar and having a socket for receiving said latch bar, said latch means and latch bar being arranged so that said frames are drawn together as said latch bar is slid into latching engagement with said latch means when said frames are in said closed position;
(m) a lever pivotally mounted on said upper frame, a first end of said lever being adapted for engaging the underside of said latch bar in said latched position; and
(n) pneumatically driven means arranged on said upper frame for urging a second, opposite end of said lever downward to force said first end of said lever upward into engagement with said underside of said latch bar so as to force said frames into said mutual engagement.

12. The adjustable framework of claim 11 wherein a plurality of said latch bars and associated latch means are arranged on said edge of said framework opposite said hinged connection.

13. The adjustable framework of claim 11 wherein said first and second gib means comprise bars having apertures at each end thereof, a plurality of screw-threaded rods are arranged around the peripheries of said upper and lower frames, said gib bars are mounted on said frames with said screw-threaded rods passing through in said apertures, and a pair of set nuts are arranged on each of said gib bars for tightening against said gib bars to secure said gib bars in position.

14. Adjustable clamping means adapted for use in an adjustable framework for holding a sheet of material for molding, said clamping means comprising: support plate means; a plurality of mounting bars; a plurality of rock-shaft clamping fingers secured to said mounting bars by means permitting rocking motion of said clamping fingers, each of said clamping fingers having a lever end and a gripping end; and a plurality of springs disposed between said mounting bars and said lever ends of each of said respective clamping fingers to force said lever ends away from said mounting bar so as to force said gripping ends of said clamping fingers toward said support plate means so that said sheet of material can be gripped between said clamping fingers and said support plate means.

15. The clamping means of claim 14 wherein said mounting bars are arranged as the four sides of a rectangle and are adjustable within said framework to vary the size of said rectangle, and said support plate means are correspondingly adjustable to form a rectangle in registry with said plurality of clamping fingers.

16. In an adjustable framework for holding a sheet and including a pair of separable frames having a closed position in which one frame closely overlies the other frame, the improvement comprising: support plate means on one frame; a plurality of movable clamping fingers on the other frame; spring means associated with each of said clamping fingers for biasing each of said fingers toward said support plate means, whereby said clamping fingers hold said sheet against said support plate means when said frames are in said closed position; and clamp means for establishing and maintaining said frames in said closed position in close mutual engagement.

References Cited by the Examiner

UNITED STATES PATENTS

| | | | |
|---|---|---|---|
| 1,118,858 | 11/1914 | Hiegel | 38—102.91 X |
| 1,529,353 | 3/1925 | Hall | 292—144 |
| 1,901,963 | 3/1933 | Hansen | 38—102.5 |
| 2,134,754 | 11/1938 | Flint et al. | 18—19 |
| 2,521,889 | 9/1950 | Yustin | 38—102.91 X |
| 2,786,701 | 3/1957 | Povlich | 292—144 |
| 2,899,196 | 8/1959 | Hoagensten et al. | 269—254 X |
| 3,006,032 | 10/1961 | Baker et al. | 18—17 X |
| 3,058,152 | 10/1962 | Eldred et al. | 18—17 |
| 3,130,451 | 4/1964 | Morse | 18—19 |
| 3,131,432 | 5/1964 | Battell et al. | 18—17 |
| 3,158,904 | 12/1964 | Gray et al. | 18—19 |

J. SPENCER OVERHOLSER, *Primary Examiner.*